(12) United States Patent
Audinet et al.

(10) Patent No.: US 9,003,013 B2
(45) Date of Patent: Apr. 7, 2015

(54) METHOD FOR CREATING CONTENT, METHOD FOR TRACKING CONTENT USE ACTIONS, AND CORRESPONDING TERMINAL AND SIGNALS

(75) Inventors: Bertrand Audinet, Marly-les-Compiegne (FR); Benoit Cantin, Venette (FR); Jean-Claude Dufourd, Le Kremlin Bicetre (FR); Vincent Dupain, Le Meux (FR); Philippe Lafoucriere, Roberval (FR); Laetitia Orsini, Compiegne (FR)

(73) Assignee: Streamezzo, Rennes (FR)

( * ) Notice: Subject to any disclaimer, the term of this patent is extended or adjusted under 35 U.S.C. 154(b) by 279 days.

(21) Appl. No.: 12/600,090

(22) PCT Filed: May 6, 2008

(86) PCT No.: PCT/EP2008/055580
§ 371 (c)(1),
(2), (4) Date: Oct. 26, 2010

(87) PCT Pub. No.: WO2008/141933
PCT Pub. Date: Nov. 27, 2008

(65) Prior Publication Data
US 2011/0055384 A1 Mar. 3, 2011

(30) Foreign Application Priority Data
May 14, 2007 (FR) .................................... 07 03460

(51) Int. Cl.
*G06F 15/173* (2006.01)
*H04N 21/435* (2011.01)
(Continued)

(52) U.S. Cl.
CPC .......... *H04N 21/435* (2013.01); *H04N 21/235* (2013.01); *H04N 21/44204* (2013.01); *H04N 21/44222* (2013.01); *H04N 21/6582* (2013.01)

(58) Field of Classification Search
USPC ....................................................... 709/224
See application file for complete search history.

(56) References Cited

U.S. PATENT DOCUMENTS 5,796,952 A * 8/1998 Davis et al. .................. 709/224
6,138,155 A   10/2000 Davis et al.
(Continued)

FOREIGN PATENT DOCUMENTS

| CN | 1251669 A | 4/2000 |
|---|---|---|
| WO | 02103940 A2 | 12/2002 |
| WO | 2006132622 A2 | 12/2006 |

OTHER PUBLICATIONS

International Search Report from International Application No. PCT/EP2008/055580, mailed Jun. 30, 2008.
(Continued)

*Primary Examiner* — Phuoc Nguyen
*Assistant Examiner* — Steven Nguyen
(74) *Attorney, Agent, or Firm* — Zilka-Kotab, PC

(57) ABSTRACT

A method is provided for tracking at least one use of at least one piece of multimedia content on a terminal connected to a communication network. The piece of content is transmitted to the terminal in the form of at least one description file generated according to a predetermined description format. The method includes using the piece of content by a user of the terminal, including activation of at least one interaction element; implementing at least one instruction followed by the use associated with the activated interaction element; executing the use tracking instruction controlling storage of at least one piece of information concerning the activation of the interaction element, or use tracking information; and transmitting by the terminal the piece of use tracking information to a tracking terminal in charge of processing the use tracking information.

10 Claims, 3 Drawing Sheets

(51) Int. Cl.
*H04N 21/235* (2011.01)
*H04N 21/442* (2011.01)
*H04N 21/658* (2011.01)

(56) References Cited

U.S. PATENT DOCUMENTS

| | | | |
|---|---|---|---|
| 2002/0078191 A1* | 6/2002 | Lorenz | 709/223 |
| 2002/0116471 A1 | 8/2002 | Shteyn | |
| 2003/0005465 A1 | 1/2003 | Connelly | |
| 2005/0071865 A1 | 3/2005 | Martins | |
| 2006/0271605 A1* | 11/2006 | Petruzzo | 707/201 |
| 2007/0180302 A1* | 8/2007 | Allen et al. | 714/6 |
| 2009/0290852 A1 | 11/2009 | Wright | |

OTHER PUBLICATIONS

Written Opinion from International Application No. PCT/EP2008/055580, mailed Jun. 30, 2008.
Office Action from Chinese Patent Application No. 200880016025.3, dated Aug. 3, 2012.
First Office Action from Chinese Patent Application No. 200880016025.3, dated May 6, 2011.
French Search Report and Written Opinion from French Patent Application No. 0703460, dated Jan. 11, 2008.
Office Action from Chinese Patent Application No. 200880016025.3, dated Feb. 17, 2013.
Second Office Action from Chinese Patent Application No. 200880016025.3, dated Feb. 22, 2012.

* cited by examiner

METHOD FOR CREATING CONTENT, METHOD FOR TRACKING CONTENT USE ACTIONS, AND CORRESPONDING TERMINAL AND SIGNALS

CROSS-REFERENCE TO RELATED APPLICATIONS

This Application is a Section 371 National Stage Application of International Application No. PCT/EP2008/055580, filed May 6, 2008 and published as WO 2008/141933 on Nov. 27, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of reproducing multimedia content on a terminal, e.g., a desktop computer, a portable computer, a mobile radio-type terminal, PDA (Personal Digital Assistant), etc.

More precisely, the disclosure is based on the compilation and transmission, on a terminal, of use activity tracking information relating to content, to portions of this content or to elements representative of this content.

Multimedia content is understood to mean a set consisting of at least one animated graphic scene, also called a multimedia scene, and a series of commands enabling this scene to be played. A multimedia scene corresponds, in particular, to the arrangement of a set of graphic objects in time and space, with which the user of the terminal can interact.

The disclosure applies, in particular, to already known graphic scene description formats such as MPEG-4/LASeR (Lightweight Application Scene Representation), 3GPP DIMS (Dynamic Interactive Multimedia Scenes), MPEG-4/BIFS (Binary Format Scene), SVG (Scalable Vector Graphics), SMIL (Synchronized Multimedia Integration Language), XHTML (Extensible HyperText Markup Language), etc.

BACKGROUND OF THE DISCLOSURE

A certain number of techniques are known, which enable tracking of content use on a terminal, among which are included the processing of content server logs, techniques using markers, techniques implementing scripts or else techniques implementing application extensions in the terminal.

1. Processing of Server Logs

This technique consists in applying a computer programme to the content server logs, which generally uses the HTTP protocol. This programme adds a line of textual information to the end of the log file upon each content request.

This line contains a set of information such as the origin of the request, the protocol and the type of request, the address of the requested content, success or an error code, the type of browser, the original content of the request . . . .

By cross-referencing between the various lines added, and by assuming that there is a single user per origin of the request, the downloading information for a content family by a user can be reconstructed.

The disadvantages of this technique of the prior art lies in the fact that it is not possible to differentiate between content downloaded onto a terminal, i.e., the request of which was followed by success, and used by the terminal, and content pre-loaded onto the terminal with a view to later consumption or use, when the terminal is in a mode unconnected to the communication network or offline.

Another disadvantage is that it is not possible to track content consumed multiple times, when the terminal is in disconnected mode.

Neither does this technique enable differentiation between the downloading of content and content use activity, such as partial reproduction of the content, backing up certain elements of the content . . . .

2. Techniques Implementing Markers or "Tags"

The principle of these techniques ("Accrue Insight," "ESTAT'PRO," "WEBandSTATS," "Weboscope," "Webtrends Reporting Series," "Wysistats" . . . ) is to call up content, an image or a URL, using parameters enabling the user to be "tracked," and to pull up available information via JavaScript.

They therefore require code to be inserted into the access pages of the content server.

They thus enable access to a service to be traced, even if it is carried out entirely in a description language with script, such as Flash.

For example, in content anticipating user interactivity, which enables reading of an element of the scene to be initiated, a message can also be sent to an external server when the action is initiated, in order to record this reading.

However, one disadvantage of these techniques is that they require an outside server in order to record the tracing request.

In addition, these techniques do not work in connected mode.

3. Techniques Implementing Scripts

These techniques implement an interpreted programme, which is written in a language such as "ECMA-Script" or "Action-Script," which creates the tracking information and sends same to the server responsible for processing this information.

One disadvantage of these techniques lies in the fact that this information cannot be stored on the terminal, for security reasons.

As a matter of fact, it is unadvisable to perform "scripting" and at the same time write into the memory of a terminal. For example, security restrictions are specified for the use of Java applets when they come from the Web (no permanent file writing on the terminal).

These techniques do not work, therefore, when the terminal is in disconnected mode.

4. Reader Application Extensions

These techniques consist in installing a special reader on the terminal, e.g., such as the iPod, which has a proprietary Apple reader, and which, for example, stores the information relating to the number of musical content consumptions, and then synchronizes same with the computer.

One disadvantage of this technique lies in the use of a proprietary reader, which provides the programme enabling tracking.

SUMMARY

An embodiment of the invention is in the form of a method for creating multimedia content intended for use by a terminal.

According to an embodiment of the invention, a use tracking instruction is associated with at least one interaction element present in said content, which controls storage of at least one piece of information relating to the activation of said interaction element, also known as use tracking information.

An embodiment of the invention is thus based on a novel and inventive approach for tracking the use of multimedia content, enabling storage of the various uses of the content related to content interaction elements, irrespective of the connected or unconnected status of the terminal. The activation of an interaction element results in the desired action associated with this element, and implements a use tracking instruction associated with this activated interaction element, thereby enabling the actions carried out on the content to be traced.

In particular, the method according to an embodiment of the invention includes the steps of:
 creating a description file for said content in a predetermined description format;
 inserting at least one interaction element into said file;
 associating at least one use tracking instruction with said interaction element.

In this way, the use tracking instructions are present directly in the scene description file, and are associated with interaction elements. For example, a use tracking instruction is associated with an interaction element, such as a button, an arrow . . . , so as to record the action induced by activating the interaction element.

According to an embodiment of the invention, the use tracking information belongs to the group including:
 identifiers representative of said content;
 identifiers representative of an object of said content;
 identifiers representative of an action carried out on said content;
 identifiers representative of a user of said content;
 identifiers representative of said terminal;
 timestamp information.

The use tracking information enables the various actions carried out on the content to be traced as best as possible, and, for this purpose, includes identifiers enabling the tracked action to be accurately identified.

In particular, the use tracking information makes it possible to know global information, such as the identification of the terminal, the identification of the user of the terminal or the identification of the content the activity of which is being traced. The tracking information likewise makes it possible to obtain more accurate information about the use of the content, such as the identification of an object of the content, if the activity is related to an object, of a particular type of activity (e.g., "reading of the content," "pause in reading the content," "activation button activation in the content" . . . ). The tracking information can likewise contain timestamp information enabling a moment of use to be associated with an action.

In particular, the tracking information belongs to the group including:
 instructions in said description format, enabling access to a memory space of said terminal;
 instructions in a specific programming format internal to said terminal, which enables access to a memory space of said terminal;
 instructions enabling access to a memory space external to said terminal. The tracking instructions thus enable the above-described tracking information to be stored in the terminal or in a memory space external to said terminal.

In addition, the tracking information can be of various types, and, in particular, in a first alternative, they are defined according to the same format as the one used for describing the content. In this way, storage of the tracking information in the terminal is managed by instructions complying with the programming format for the content description file.

In an alternative embodiment, the tracking instructions are defined in a specific programming format, which is internal to the terminal, and which is different from the programming language used for describing the content. In this case, storage of the tracking information in the terminal is managed by instructions complying with a programming format specific to the terminal.

In yet another alternative, the tracking information enables access to a memory space external to the terminal.

An embodiment of the invention likewise relates to a method for tracking at least one use of at least one multimedia content on a terminal connected to a communication network, said content being transmitted to said terminal in the form of at least one description file created in a predetermined description format.

According to an embodiment of the invention, such a method includes the following steps:
 use of said content by a user of said terminal, including activation of at least one interaction element;
 implementation of at least one use tracking instruction associated with said activated interaction element;
 execution of said use tracking instruction controlling storage of at least one piece of information relating to said activation of said interaction element, also known as use tracking information;
 transmission, by said terminal, of at least one piece of use tracking information to a tracking server responsible for processing said use tracking information.

In this way, content created by the content-creating method as described above enables tracking of the use thereof by the tracking method of an embodiment of the invention. In a first phase, the content is transmitted to the terminal. Next, each use of the content activating a content interaction element implements a use tracking instruction associated with the creation of the content and with the activated interaction element. The execution of this instruction controls the storage of at least one piece of use tracking information relating to the activation of the interaction element and the transmission of this tracking information to a server responsible for the processing thereof, which is called the tracking server.

According to an embodiment of the invention, the transmission step includes the following sub-steps:
 transmission, by said terminal, of said use tracking information to a presentation server;
 temporary storage, by said presentation server, of said received use tracking information delivering temporary use tracking information;
 transmission, by said presentation server, of said temporary use tracking information to said tracking server.

In the case where the use tracking information cannot be transmitted directly to the tracking server by the terminal (e.g., in the case where the terminal does not have access to the tracking server, in the case where the tracking server is not available at the moment when the information is transmitted . . . ), the terminal transmits same to the presentation server, which, for example, may be the server which transmitted the content to it.

The presentation server temporarily stores the use tracking information transmitted by the terminal, prior to then forwarding same to the tracking server.

According to an embodiment of the invention, the tracking method includes, at least when the terminal is in disconnected mode, a step of temporarily storing said use tracking information in said terminal, and then a step of off-line forwarding said stored use tracking information to a server.

In this way, the tracking method according to an embodiment of the invention enables the tracking of content use, even when the terminal is not connected to the communication network.

As a matter of fact, in this case, for example, the terminal has the means of temporarily storing the user tracking information, and of then transmitting same, in delayed time, to a server, when it is connected (the tracking server or the presentation server as described above).

In particular, the transmission step is carried out, in delayed time, in comparison with said step of using said content based on predetermined criteria belong to the group including:
use performance criteria for said terminal;
predefined availability criteria for said tracking server;

Therefore, this temporary storage can likewise be used in the case where the terminal is connected, for storage performance reasons.

As a matter of fact, the fact of being capable of transmitting the use tracking information, in delayed time, from the content use, makes it possible to not tie up the communication network during use of the content, and to choose the appropriate time for transmitting the tracking information.

In addition, the use tracking information belongs to the group including:
identifiers representative of said content;
identifiers representative of an object of said content;
identifiers representative of an action carried out on said content;
identifiers representative of a user of said content;
identifiers representative of said terminal;
timestamp information.

An embodiment of the invention likewise relates to a terminal capable of receiving and reproducing multimedia content, said content being transmitted to said terminal in the form of at least one description file in a predetermined description format.

According to an embodiment of the invention, such a terminal includes the following means:
means of using said content by a user of said terminal, including activation of at least one interaction element;
means of implementing at least one use tracking instruction associated with said activated interaction element;
means of executing said use tracking instruction controlling storage of at least one piece of information relating to said activation of said interaction element, also known as the use tracking information;
means of transmitting at least one piece of use tracking information to a tracking server responsible for processing said use tracking information.

According to an embodiment of the invention, such a terminal likewise includes means of storing said use tracking information.

Such a terminal is, in particular, capable of implementing the use tracking method described above.

An embodiment of the invention also relates to a description signal for at least one piece of multimedia content, which is intended for use on at least one terminal capable of receiving and reproducing multimedia content.

According to an embodiment of the invention, a description signal carries at least one interaction element associated with at least one use tracking instruction. A content description such as this thus enables the uses of this content to be tracked, by a tracking method such as described above.

Finally, an embodiment of the invention relates to a storage signal, which is intended for use on at least one terminal capable of receiving and reproducing multimedia content.

Such a signal carries at least one storage instruction belonging to the group including:
instructions for a first storage mechanism forming part of said description format, said mechanism enabling access to a memory space of said terminal;
instructions for a second specific storage mechanism internal to said terminal, said mechanism being and enabling access to a memory space of said terminal;
instructions enabling access to a memory space external to said terminal.

Such a signal in particular enables implementation of the use tracking instructions associated with the content interaction elements.

BRIEF DESCRIPTION OF THE DRAWINGS

Other characteristics and advantages will become more apparent upon reading the following description of a particular embodiment, given as an illustrative and non-limiting example, and from the appended drawings, in which.

DETAILED DESCRIPTION OF ILLUSTRATIVE EMBODIMENTS

1. General Principle

The general principle of an embodiment of the invention is based on the activation of events present in the content used on a terminal enabling tracking of the various uses of this content, whether the terminal is in connected mode or not.

Figure 1:
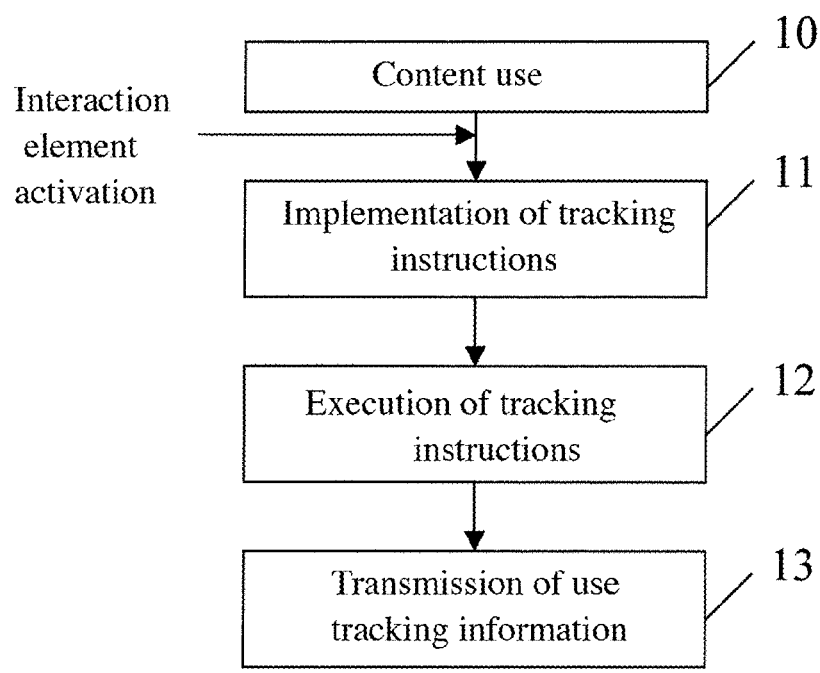
FIG. 1 shows the principal steps of the content use tracking method according to an embodiment of the invention.
Figure 2A:
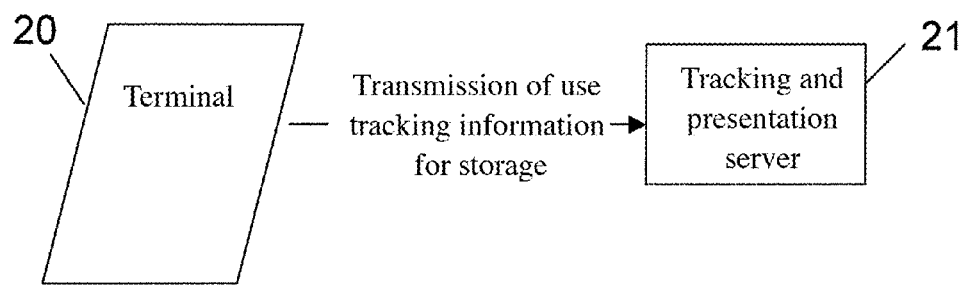
FIGS. 2a and 2b show exemplary systems in which the method of FIG. 1 is implemented, according to two alternatives of a first embodiment.
Figure 2B:
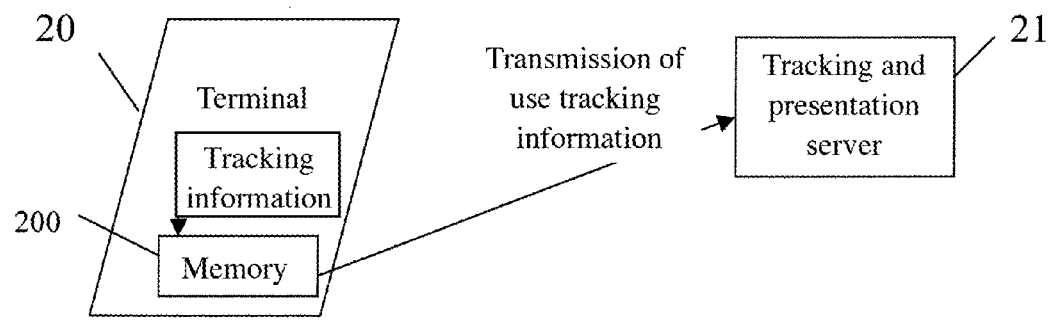
Figure 3:
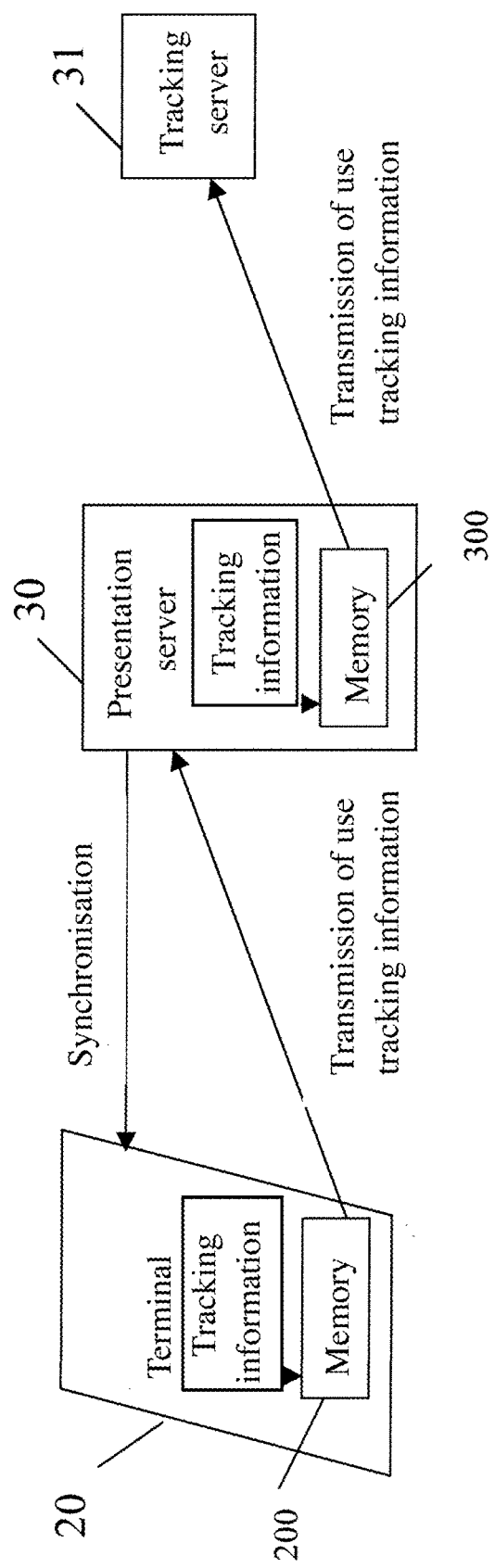
FIG. 3 shows an exemplary system in which the method of FIG. 1 is implemented according to a second embodiment.

The principal steps of the content use tracking method according to an embodiment of the invention are introduced in connection with FIG. 1.

During a first content use step 10, an interaction element is activated. This may first be an interaction element related to starting the content reading, and then interaction elements representative of a current use of the content.

The activation of this interaction element involves a second step 11 of implementing the use tracking instruction or instructions associated with the activation of this interaction element.

These tracking instructions are next executed during an execution step 12.

The execution of these tracking instructions controls the storage of use tracking information relating to the activation of the interaction element, and the transmission thereof, during a transmission step 13, to a server responsible for the processing of same.

In this way, each use of the content (start of the reading thereof, pausing the reading thereof, stopping the reading thereof, pressing a button, pressing on a scroll bar, activation of a content object . . . ) is traced, recorded and transmitted, in the form of use tracking information, to a server responsible for processing this use tracking information.

2. First Embodiment

Three alternatives of a first embodiment of the invention are introduced hereinbelow.

In this first embodiment, the content server 21, which is also called a presentation server, is likewise the tracking server, i.e., the server which is responsible for receiving and processing the use tracking information of the terminal 20.

2.1 First Alternative

In a first alternative, the terminal is in connected mode during use of the content, i.e., the terminal has access to the content server, which is also called the presentation server, and the transmission of the use tracking information is carried out during use of the content.

In a first phase, the terminal issues a request for content to a tracking and presentation server.

Still connected to the network, the terminal receives the content from the tracking and presentation server and begins to read it, e.g., in order to reproduce it on its screen.

The start of the reading operation corresponds to the activation of an interaction element present in this content.

The activation of this interaction element involves the implementation of a series of use tracking instructions, including:

- an instruction for transmitting to the tracking server and for storing an identifier representative of the terminal, if available;
- an instruction for transmitting to the tracking server and for storing an identifier representative of the current user of the content, if available;
- an instruction for transmitting to the tracking server and for storing an identifier representative of the content, referenced as SID;
- an instruction for transmitting to the tracking server and for storing an identifier representative of the type of use or action in progress, i.e., in this example, the start of the content reading operation, referenced as AID.

These various transmission instructions can be executed in a single operation, and give rise to the transmission of a single message aggregating all of said information, or be executed in several operations and transmitted in various messages.

In this way, the various identifiers are therefore transmitted directly to the tracking server to be stored in a dedicated space of this tracking server, with a view to the subsequent processing thereof.

With each new action during use of the content, a specific interaction element is activated, implementing various use tracking instructions, in addition to instructions enabling the desired action to be carried out.

These use actions, for example, can be the following:
- interruption of the content reading;
- access to content stored in the terminal;
- activation of one or more content objects;
- content marking, e.g., in order to indicate a user preference, in order to add the content to a list of contents . . . ;
- deletion of the cache memory of the terminal.

In addition, stopping the reading of the content, when the latter reaches the end thereof, likewise activates a specific interaction element.

The use tracking instructions implemented, for example, can be the following, which are likewise given as non-limiting examples:

- an instruction for transmitting to the tracking server and for storing an identifier representative of a content use interruption action;
- an instruction for transmitting to the tracking server and for storing an identifier representative of an action for accessing content stored in the terminal;
- an instruction for transmitting to the tracking server and for storing an identifier representative of an action for activating a content object;
- an instruction for transmitting to the tracking server and for storing an identifier representative of a content object, referenced as OID;
- an instruction for transmitting to the tracking server and for storing an identifier representative of a content marking action;
- an instruction for transmitting to the tracking server and for storing an identifier representative of a cache memory deletion action.

All of these identifiers are likewise transmitted to the tracking server to be stored in a dedicated space of the tracking server, with a view to the subsequent processing thereof.

A scene description fragment is introduced hereinbelow, which describes an example of the use of tracking the actions on a piece of content, in a specific format, an "RSP" page (Rich Media Server Page):

```
<Action startTime="NOW">
    <ActionKey concatReadID="Global:UserTracking"
        concatWriteID="UserTrackingScene"/>
    <ActionKey animObject="SaveUserTracking"/>
</Action>
Conditional DEF="SaveUserTracking">
    <Save serviceID="<?=$serviceID?>" groupID="5"
        Nodes="Global:UserTracking"/>
</Conditional>
```

2.2 Second Alternative

According to a second alternative of this embodiment, the terminal 20 remains connected to the communication network during use of the content and is therefore capable of having access to the tracking and presentation server. However, for reasons generally related to communication performance, the use tracking information is first stored in a memory space 200 of the terminal prior to being transmitted to the tracking server 21.

As a matter of fact, the transmission of such information is preferably carried out during particular phases of the connection of the terminal to the communication network, in particular so as to not disrupt the use of the terminal. For example, the transmission of this information can be carried out during a non-use phase of the terminal, the latter still being connected to the communication network.

To illustrate, the use tracking instructions implemented by activating the interaction elements cited above for illustrative purposes, can be the following:

- an instruction for storing an identifier representative of the terminal, if available;
- an instruction for storing an identifier representative of the current user of the content, if available;
- an instruction for storing an identifier representative of the content, referenced as SID;
- an instruction for storing an identifier representative of the type of use or type of action in progress, i.e., in this example, the start of the content reading operation, referenced as AID;
- an instruction for storing an identifier representative of a content use interruption action;
- an instruction for storing an identifier representative of an action for accessing content stored in the terminal;
- an instruction for storing an identifier representative of an action for activating a content object;
- an instruction for storing an identifier representative of a content object, referenced as OID;
- an instruction for storing an identifier representative of a content marking action;
- an instruction for storing an identifier representative of a cache memory deletion action.

In this way, the actions carried out during use of the content are stored in particular in the form of identifiers.

These stored identifiers are then transmitted to the tracking server per block, once the use of the content has ended.

This transmission can be carried out starting with the end of the content use, or in delayed time, according to predetermined criteria, such as communication performance criteria or tracking server availability criteria.

The application server next carries out the required processing operations on the identifiers, in order to be able to retrace the various content use actions.

2.3 Third Alternative

In a third alternative of the first embodiment, the terminal is in disconnected mode during content use. The transmission of the use tracking information therefore cannot be carried out as the content is being used, since the terminal does not have access to the server.

According to a first example, in a first phase, the terminal, which is in connected mode, issues a request to the presentation server for one or more pieces of content.

Still connected to the network, the terminal receives the content or contents, the use of which occurs later, in disconnected mode.

According to another example, the terminal does not issue any request for content, but has already pre-recorded, or subscribed to a content distribution channel, for example, and, based on the preferences of this recording, the content server transmits one or more pieces of content to the terminal, without any explicit request from the terminal.

The contents are therefore loaded onto the terminal and can be used in disconnected mode.

In this way, the actions carried out on various contents can be stored in particular by means of the identifier representative of the content.

The various possible interaction elements will not be described once again, which are the same as those cited as non-exhaustive examples in the first alternative of this first embodiment.

Since the terminal is in disconnected mode during use of the content, the use tracking information is first stored in the terminal prior to being transmitted to the tracking server, as in the second alternative of this first embodiment.

Neither will a detailed description be provided here of the various use tracking instructions implemented by activating the various interaction elements, the latter having already been described in the second alternative, in the form of examples.

The content use tracking information, including, in particular, the various aforementioned identifiers, are therefore stored in a memory space of the terminal while awaiting for same to reconnect to the network, thereby making it possible to transmit the stored information to the tracking server responsible for the processing thereof.

In this alternative, the tracking information is therefore transmitted to the tracking server in delayed time.

3. Second Embodiment

In this second embodiment, the tracking server 31, i.e., the server which is responsible for receiving and processing the use tracking information of the terminal, is not directly accessible via the terminal, whether the latter is in connected mode or not.

For example, it may be a case in which the content server, which is also called the presentation server 30, and which is accessible via the terminal, is not the tracking server.

In particular, an example is introduced hereinbelow in which several servers are involved in providing the terminal with content for which it has made a request.

As a matter of fact, a presentation server can provide the content presentation and interaction service, and another server, called the media management server, provides a management service for the media used in the requested content.

It is likewise this server which is used for tracking the use actions, and, therefore, it will subsequently be called a media management and tracking server.

The presentation server 30 thus receives the request and transmits the portion of this request corresponding to the media to the media management and tracking server. In response, the latter sends the relevant media to the presentation server, which incorporates same into the remainder of the content and sends the result to the terminal.

In this context, the terminal does not have knowledge about the presence of the media management and tracking server, but only about the server which provided the content to it, namely the presentation server. At the moment when the use tracking information is transmitted, the terminal can therefore send same only to the server that it knows, the presentation server 30. The latter undertakes the responsibility of transmitting this information, possibly later, to the media management and tracking server 31.

In addition, in this second embodiment, whether in connected mode or not during use of the content, the terminal is considered to first store the use tracking information, in a memory space 200, prior to transmitting same to the presentation server, in delayed time or not.

The various interaction elements capable of being activated during use of the content will not be described again, the examples of which are provided in the description of the first embodiment.

In the same way, the various examples of use tracking instructions implemented by the activation of these interaction elements are the same as those described in detail in the second and third alternatives of the first embodiment, namely instructions for storing identifiers in the terminal.

These identifiers stored in the terminal are next transmitted to the presentation server.

More particularly, the presentation server element which receives the use tracking information including these stored identifiers in particular is, for example, a service referenced as a "node service".

A presentation service may include several different node services.

The transmission of tracking information from the terminal to the presentation server is done primarily per block, e.g., during synchronisation between the terminal and the content servers.

It can be done as the content is being used, if the terminal is in connected mode, or in delayed time, if the terminal is not in connected mode.

For example, the transmission of the tracking information to the presentation server is carried out upon request by the server, e.g., owing to an "http GET" request on an "RSP" page.

Since the bandwidth between the terminal and this server is limited, the format of the information transmitted must be reduced to a minimum. The tracking information stored in the terminal is therefore likewise optimised in terms of size.

An example of tracking information transmitted by the terminal to the server is introduced hereinbelow:

Z-c6ihNa-q*B*gVO-fwt79HcW#080207#NokiaN70; s1;s8; b10;b7;a2;a1;b8;a1;s10;s1

The presentation server next locally stores the tracking information received by the terminal block in a memory space 300, with a view to subsequently transmitting same to the media management and tracking server responsible for processing the content use tracking information.

This storage in the presentation server is carried out in connection with the same RSP page as the one having received the information from the terminal.

The presentation server next transmits the information that it has stored to the tracking server.

This transmission from the presentation server to the tracking server is generally performed in batches, either at the initiative of the presentation server or the node service involved or upon request by the tracking server, e.g., within the framework of an "SOA" architecture (Service-Oriented Architecture).

An example of data exchange between a node service of a presentation service and a tracking service responsible for processing tracking information is introduced hereinbelow:
<node userId="Z-c6ihNa-q*B*gVO-fwt79HcW" date="11/17/2006-01:00:00" sid="1" oid="1" aid="1' id="1001" previous="null" next="null"/>

This extract of exchanged data corresponds to a "node" representing an atomic unit distance. This data extract is reconstructed from several pieces of saved use tracking information, and consolidates all of the relevant data for a particular action.

The tracking server next carries out the required processing operations on the tracking information and, in particular, on the identifiers, in order to be able to retrace the various content use actions.

An embodiment of the invention enables user activity to be tracked irrespective of the connection status of the terminal. As a matter of fact, multimedia content can be transmitted to the terminal and consumed or used at different times. In particular, the content can be consumed at a time when the terminal has no active connection to a server.

An embodiment of the invention enables tracking of the number of consumptions of a piece of content, irrespective of the connected or unconnected mode of the terminal, and to likewise separately track various types of actions performed on the content, e.g., such as reading the content, deletion of the cache memory during use of the content, tagging the content, a preference designation, partial reading of the content . . . .

An embodiment of the invention enables tracking of the uses of various objects within a single piece of content, and to do so irrespective of the fact that these various objects are part of a single piece of content (which can be due, for example, to service provisioning reasons).

An embodiment of the invention enables the use of a standard content reader, and to require neither a specific reader nor a specific extension for a standard reader, for purposes of tracking content use.

An embodiment of the invention enables the use of a reader which does not have any script interpreter, thereby enabling the use of a terminal having much fewer resources than a terminal having a reader with a script interpreter and likewise making it possible to avoid the security and computer virus problems traditionally linked to the presence of a script interpreter.

An embodiment of the invention enables tracking information collected when the terminal is not connected to the network to be sent during specific phases of the service.

Although the present disclosure has been described with reference to one or more examples, workers skilled in the art will recognize that changes may be made in form and detail without departing from the scope of the disclosure and/or the appended claims.

The invention claimed is:

1. A method comprising:
creating multimedia content intended for use by a user at a terminal, the multimedia content including a plurality of interaction elements, and
associating a use tracking instruction with at least one of the plurality of interaction elements, where the tracking instruction controls storage of use tracking information associated with the activation of the interaction element, and where the use tracking information includes identifiers representative of:
the content,
an action carried out by the user on the content;
the user of the content;
the terminal; and
timestamp information corresponding to the action carried out by the user on the content;
transmitting the multimedia content from a presentation server to the terminal;
in response to use of the multimedia content by the user, transmitting the use tracking information from the terminal to a tracking server separate from the presentation server for processing by the tracking server, where the transmitting includes:
determining by the terminal that the terminal cannot directly transmit the use tracking information to the tracking server,
transmitting the use tracking information as a single string of data in a first format from the terminal to a presentation server, in response to the determining,
storing the received use tracking information at the presentation server in the first format, and
transmitting a batch of tracking information including the use tracking information in a second format different from the first format from the presentation server to the tracking server;
wherein the transmission is delayed and the use tracking information is temporarily stored at the terminal based on one or more of use performance criteria for the terminal and predefined availability criteria for the tracking server, in order to avoid tying up a communication network during use of the content by the user;
wherein the transmission is delayed and the use tracking information is temporarily stored at the terminal when a communication network cannot be detected by the terminal.

2. The method of claim 1, further comprising:
creating a description file for the content in a predetermined description format;
inserting one or more of the plurality of interaction elements into the file; and
associating said at least one use tracking instruction with said interaction element.

3. The method as claimed in claim 2, wherein the at least one use tracking instruction enables access to a memory space of the terminal, enables access to a memory space of the terminal, and enables access to a memory space external to the terminal.

4. A system, including at least one hardware processor, for:
creating multimedia content intended for use by a user at a terminal, the multimedia content including a plurality of interaction elements, and
associating a use tracking instruction with at least one of the plurality of interaction elements, where the tracking instruction controls storage of use tracking information associated with the activation of the interaction element, and where the use tracking information includes identifiers representative of:
the content,
an action carried out by the user on the content;
the user of the content;
the terminal; and
timestamp information corresponding to the action carried out by the user on the content;
transmitting the multimedia content from a presentation server to the terminal;
in response to use of the multimedia content by the user, transmitting the use tracking information from the terminal to a tracking server separate from the presentation server for processing by the tracking server, where the transmitting includes:
determining by the terminal that the terminal cannot directly transmit the use tracking information to the tracking server,
transmitting the use tracking information as a single string of data in a first format from the terminal to a presentation server, in response to the determining,
storing the received use tracking information at the presentation server in the first format, and
transmitting a batch of tracking information including the use tracking information in a second format different from the first format from the presentation server to the tracking server;
wherein the transmission is delayed and the use tracking information is temporarily stored at the terminal based on one or more of use performance criteria for the terminal and predefined availability criteria for the tracking server, in order to avoid tying up a communication network during use of the content by the user;
wherein the transmission is delayed and the use tracking information is temporarily stored at the terminal when a communication network cannot be detected by the terminal.

5. The method as claimed in claim 1, wherein the tracking information further includes identifiers representative of an object of said content.

6. A computer program product embodied on a non-transitory computer readable medium, comprising computer code for:
creating multimedia content intended for use by a user at a terminal, the multimedia content including a plurality of interaction elements, and
associating a use tracking instruction with at least one of the plurality of interaction elements, where the tracking instruction controls storage of use tracking information associated with the activation of the interaction element, and where the use tracking information includes identifiers representative of:
the content,
an action carried out by the user on the content;
the user of the content;
the terminal; and
timestamp information corresponding to the action carried out by the user on the content;
transmitting the multimedia content from a presentation server to the terminal;
in response to use of the multimedia content by the user, transmitting the use tracking information from the terminal to a tracking server separate from the presentation server for processing by the tracking server, where the transmitting includes:
determining by the terminal that the terminal cannot directly transmit the use tracking information to the tracking server,
transmitting the use tracking information as a single string of data in a first format from the terminal to a presentation server, in response to the determining,
storing the received use tracking information at the presentation server in the first format, and
transmitting a batch of tracking information including the use tracking information in a second format different from the first format from the presentation server to the tracking server;
wherein the transmission is delayed and the use tracking information is temporarily stored at the terminal based on one or more of use performance criteria for the terminal and predefined availability criteria for the tracking server, in order to avoid tying up a communication network during use of the content by the user;
wherein the transmission is delayed and the use tracking information is temporarily stored at the terminal when a communication network cannot be detected by the terminal.

7. The method as claimed in claim 1, wherein the terminal issues a request for the multimedia content to the presentation server and receives the requested multimedia content from the presentation server in response to the request.

8. The method as claimed in claim 7, wherein the request from said terminal is received by the presentation server, and the presentation server transmits a portion of the request to the tracking server, and in response to receiving the portion of the request, the tracking server sends media relevant to the portion of the request to the presentation server, and the presentation server incorporates the media into a remainder of the requested multimedia content and sends the requested multimedia content to the terminal.

9. The method as claimed in claim 1, wherein transmitting the batch of the tracking information to the tracking server is performed at an initiative of the presentation server.

10. The method as claimed in claim 1, wherein transmitting the batch of the tracking information to the tracking server is performed at an initiative of the tracking server.

* * * * *